United States Patent
Lu et al.

(10) Patent No.: US 8,707,049 B2
(45) Date of Patent: Apr. 22, 2014

(54) AUTHENTICATION METHOD AND KEY DEVICE

(75) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 480 days.

(21) Appl. No.: 12/191,332

(22) Filed: Aug. 14, 2008

(65) Prior Publication Data
US 2009/0055892 A1 Feb. 26, 2009

(30) Foreign Application Priority Data

Aug. 20, 2007 (CN) .......................... 2007 1 0120472

(51) Int. Cl.
*G06F 21/00* (2013.01)

(52) U.S. Cl.
USPC ........... 713/184; 713/172; 713/173; 713/185; 380/44; 726/17; 726/20

(58) Field of Classification Search
USPC ............ 380/44; 713/172, 173, 182, 184, 185; 726/16, 17, 20
See application file for complete search history.

(56) References Cited

U.S. PATENT DOCUMENTS

| | | | |
|---|---|---|---|
| 7,434,251 B2 * | 10/2008 | Ooi et al. ........................... | 726/9 |
| 7,519,989 B2 * | 4/2009 | Lin et al. ........................... | 726/9 |
| 7,555,655 B2 * | 6/2009 | Smith et al. ..................... | 713/185 |
| 7,743,409 B2 * | 6/2010 | Gonzalez et al. ................. | 726/9 |
| 7,748,031 B2 * | 6/2010 | Gonzalez et al. ................. | 726/9 |
| 7,904,946 B1 * | 3/2011 | Chu et al. .......................... | 726/5 |
| 7,921,455 B2 * | 4/2011 | Lin et al. ........................... | 726/9 |
| 7,930,554 B2 * | 4/2011 | Coulier et al. ................ | 713/184 |
| 7,996,861 B1 * | 8/2011 | Delpuch ......................... | 725/30 |

(Continued)

FOREIGN PATENT DOCUMENTS

| | | |
|---|---|---|
| EP | 1775673 A2 | 4/2007 |
| EP | 1833219 A1 | 9/2007 |
| GB | 2423396 A * | 8/2006 |
| WO | WO 2006/044717 A2 | 4/2006 |

OTHER PUBLICATIONS

Chan, P.K.; Choy, C.S.; Chan, C.F.; Pun, K.P.; "Preparing Smartcard for the Future: From Passive to Active", IEEE Transactions on Consumer Electronics, vol. 50, Issue 1, Jun. 28, 2004, pp. 245-250.*

(Continued)

*Primary Examiner* — Victor Lesniewski
(74) *Attorney, Agent, or Firm* — Hammer & Associates, P.C.

(57) ABSTRACT

The present invention discloses an authentication method and a key device and relates to the information security field. The authentication method comprises initiating user authentication, generating a dynamic code and then a first verification code on the basis of the dynamic code, and outputting the dynamic code, by a key device; and receiving a second verification code entered by a user via a host, and collating the second verification code with the first verification code, by the key device, and if a match is found, the user access is authorized to the key device; otherwise, the user access is prohibited. The key device comprises a trigger module, a generator module, an output module, a communication module, a collator module, a controller module and a security module. According to the present invention, better security is achieved by reducing the possibility of sensitive information disclosure and misuse in case of password theft for the key device.

18 Claims, 2 Drawing Sheets

(56) References Cited

U.S. PATENT DOCUMENTS

| | | | |
|---|---|---|---|
| 8,132,243 B2* | 3/2012 | Bychkov | 726/9 |
| 2001/0054148 A1* | 12/2001 | Hoornaert et al. | 713/172 |
| 2006/0136739 A1* | 6/2006 | Brock et al. | 713/184 |
| 2007/0067828 A1* | 3/2007 | Bychkov | 726/3 |
| 2007/0277044 A1* | 11/2007 | Graf et al. | 713/185 |
| 2008/0046750 A1* | 2/2008 | Fletcher et al. | 713/185 |
| 2008/0072058 A1* | 3/2008 | Cedar et al. | 713/184 |
| 2008/0263362 A1* | 10/2008 | Chen | 713/184 |
| 2009/0049307 A1* | 2/2009 | Lin | 713/185 |
| 2011/0030053 A1* | 2/2011 | Lin et al. | 726/20 |

OTHER PUBLICATIONS

Scheuermann, D.; "The smartcard as a mobile security device", Electronics & Communication Engineering Journal, vol. 14, Issue 5, Dec. 16, 2002, pp. 205-210.*

* cited by examiner

AUTHENTICATION METHOD AND KEY DEVICE

FIELD OF THE INVENTION

The present invention relates to the information security field, and more particularly, to an authentication method and a key device used in the authentication.

BACKGROUND OF THE INVENTION

With development of computer technology, information security is increasingly eyed. Authentication is an important aspect of information security, as a process of verifying operator's identity by a PC or network system. In computer systems and networks, the authorization is assigned to a digital identity of a user.

At present, a widely used authentication mechanism is the username/password verification. A user has to enter a combination of username and password to complete authentication, which is requested by a software application. A user password is set by the user himself. Others don't know the password. If the user enters a correct password, the user will be accepted as a legitimate user. But this mechanism fails to provide security and use convenience. To prevent from forgetting the password, many users often save the password at a "secure" place. In this case, it is easy for the password to be known by others. For different software applications, a user may set different combinations of username and password. It is difficult to remember those different usernames and/or passwords. The username/password mechanism is of one-factor authentication (one criteria is used to authenticate the user). This can be counterfeited readily. For example, some attackers may use illegally obtained user identification, such as username and password, to use software applications or resell those information. Some legitimate users are harmed by this kind of acts.

In recent years, the key device based authentication mechanism develops fast, which is more convenient and secure. The key device consists of a processor and a memory in a compact form. The key device can be plugged into a data communication port of the computer. Typically, the data communication port uses Universal Serial Bus (USB). Thus, the key device is also known as the USB key or the USB token. The key device is designed to physically resist attacks so that it provides high-level security.

The key device is broadly applied to authentication in online banking and Virtual Private Network (VPN) systems. The key device could encrypt and decrypt data stored in its memory, thus it is suitable for software copyright protection. Furthermore, sensitive information (e.g. passwords) can be kept in the key device to implement secure storage or to avoid forgetting. Presently, advanced key devices are programmable, i.e. any code previously stored in the key device can be executed there.

In most cases, the key device employs a security-designed chip to perform security functions. The security-designed chip has an outstanding security performance advantage in addition to the features of a common embedded microcontroller. During design stage, the architecture of a security-designed chip is specially processed for high security performance. Generally, the security-designed chip should be compliant with some standard (e.g. TCG TPM v1.2 specification or ISO 15408 standard), or be certified by an authority (e.g. China Password Administration Commission). Among generally available security-designed chips, the ST19WP18 microcontroller, manufactured by STMicroelectronics, is EAL5+ (enhanced) certified. EAL5+ (enhanced) is one of the highest levels for this kind of products in ISO 15408 standard certification. The smartcard chip is a sort of security-designed chips.

In general, a security module is formed by coupling a security-designed chip to other circuitry in a key device to perform information security operations. The operations performed by the security module include data interacting (encrypting of data to be written into the device, or decrypting of data to be read from the device), authentication information processing, storing/verifying a password, storing/verifying a signature, storing/verifying a certificate, access right management, and presetting code and executing data computation. Presetting code includes presetting a user software fragment, which cannot be read out of the device and is used to perform data computation within the device, and presetting a software protection application interface function, which is an interface-level function between the device and the software developer application.

Currently, a user is authenticated to a key device via a verification code. The user enters a verification code on the computer to which the key device is connected. The key device then obtains the verification code and compares the verification code with another verification code stored in its memory. If a match is found, the user is deemed as a legitimate holder of the device and is authorized access to the device; otherwise, access to the device is prohibited.

Although the user can change his verification code regularly, it is almost impossible to change it every time it is used. Thus, if the verification code is obtained by a hacker, it could be used to get access to sensitive information, such as a certificate, stored in the key device, which might bring great loss to the legitimate user.

SUMMARY OF THE INVENTION

To improve security in authenticating a user with a key device, the present invention provides for an authentication method and a key device used in the authentication. The solution of the present invention is set forth below.

In one aspect, the invention provides for an authentication method, which comprises the steps of:

initiating user authentication by a key device;

generating a dynamic code and then a first verification code on the basis of the dynamic code, and outputting the dynamic code, by the key device;

receiving by the key device a second verification code entered by a user via a host, the second verification code being produced with the same mechanism as used in generating the first verification code, on the basis of the dynamic code output by the key device; and collating the second verification code with the first verification code by the key device; if a match is found, authorizing access of the user to the key device; otherwise, prohibiting access of the user to the key device.

The step of initiating user authentication by a key device particularly comprises such a sub-step that the key device starts user authentication after receiving a trigger signal produced from pressing a button or switch on the key device by a user.

Alternatively, the step of initiating user authentication by a key device particularly comprises such a sub-step that the key device starts user authentication after receiving a trigger signal from a host.

Or, the step of initiating user authentication by a key device particularly comprises such a sub-step that the key device automatically starts user authentication at a regular time interval.

A value of the regular time interval is previously defined by a manufacturer or user of the key device.

The step of generating a verification code on the basis of the dynamic code particularly comprises a sub-step of directly using the dynamic code as a verification code.

Alternatively, the step of generating a verification code on the basis of the dynamic code particularly comprises a sub-step of transforming the dynamic code into a verification code.

Or, the step of generating a verification code on the basis of the dynamic code particularly comprises a sub-step of combining the dynamic code with an identification code previously defined to form a verification code.

Or, the step of generating a verification code on the basis of the dynamic code particularly comprises a sub-step of combining the dynamic code with an identification code previously defined, and transforming the combination into a verification code.

Or, the step of generating a verification code on the basis of the dynamic code particularly comprises a sub-step of transforming the dynamic code, and combining the transformed dynamic code with an identification code previously defined to form a verification code.

The identification code is previously defined by a manufacturer or user of the key device.

The combining is carried out by mosaic and/or insertion.

The transforming is carried out by changing character position in accordance with a rule previously defined and/or representation.

The step of outputting the dynamic code particularly comprises a sub-step of outputting the dynamic code to a display of the key device, or to a speaker connected with the key device to broadcast by voice.

The step of generating a dynamic code and then a first verification code on the basis of the dynamic code, and outputting the dynamic code, by the key device particularly comprises the substeps of:

generating a dynamic code by the key device;

when pressing on a button or switch of the key device by a user is detected, generating a new dynamic code, by the key device; and generating a verification code on the basis of the new dynamic code and outputting the new dynamic code by the key device.

In another aspect, the invention provides for a key device, which comprises a trigger module, a generator module, an output module, a communication module, a collator module, a controller module, and a security module; the trigger module being operative to trigger the controller module to initiate user authentication; the generator module being operative to generate a dynamic code and then a first verification code on the basis of the dynamic code, and transmitting the dynamic code to the output module, and the first verification code to the collator module, under control of the controller module; the output module being operative to output the dynamic code received from the generator module, under control of the controller module; the communication module being operative to receive a second verification code entered by a user via a host and transmit the second verification code to the collator module under control of the controller module, the second verification code being produced with the same mechanism as used in generating the first verification code, on the basis of the dynamic code output by the key device; the collator module being operative to collate the second verification code with the first verification code under control of the controller module; the controller module being operative to initiate user authentication after receiving a trigger signal from the trigger module, control the generator module to generate the dynamic code and the first verification code and transmit the dynamic code to the output module, the output module to output the dynamic code, and the collator module to collate the second verification code with the first verification code, and determine if a match is found between the first and second verification codes to authorize user access to the key device if yes or to prohibit user access to the key device if no; and the security module being operative to perform information security operations under control of the controller module if a match is found between the first and second verification codes in response to collation of the collator module.

Particularly, the trigger module is a button or switch.

Particularly, the trigger module comprises a receiving unit for receiving the trigger signal from the host; and a trigger unit for triggering the controller module to initiate user authentication after the trigger signal is received by the receiving unit.

Particularly, the trigger module comprises a clock unit for counting time; and a trigger unit for automatically triggering the controller module to initiate user authentication once a regular time interval previously defined has elapsed in accordance with a time value obtained from the clock unit.

The trigger module and the controller module are integrated into a single controller chip.

The controller chip is a security-designed chip, which includes a smartcard chip.

Particularly, the generator module comprises a direct generation unit for generating a dynamic code under control of the controller module and directly using the dynamic code as a verification code.

Particularly, the generator module comprises a transformed generation unit for generating a dynamic code under control of the controller module, transforming the dynamic code, and using the transformed dynamic code as a verification code.

Particularly, the generator module comprises a combined generation unit for generating a dynamic code under control of the controller module, combining the dynamic code with an identification code previously defined, and using the combination of the dynamic code and the identification code as a verification code.

Particularly, the generator module comprises a combined and transformed generation unit for generating a dynamic code under control of the controller module, combining the dynamic code with an identification code previously defined, transforming the combination of the dynamic code and the identification code, and using the transformed combination as a verification code.

Particularly, the generator module comprises a transformed and combined generation unit for generating a dynamic code under control of the controller module, transforming the dynamic code, combining the transformed dynamic code with an identification code previously defined, and using the combination of the transformed dynamic code and the identification code as a verification code.

Particularly, the output module is a display.

The display is a segment display, a lattice display, a character display, or a graphic display.

Particularly, the output module comprises a voice conversion unit for converting the dynamic code generated by the generator module to a voice signal; and a speaker for broadcasting in accordance with the voice signal under control of the controller module.

The output module further comprises an audio amplifier for amplifying the voice signal and transmitting the amplified voice signal to the speaker.

The voice conversion unit is a voice chip.

The voice conversion unit and the controller module are integrated into a single controller chip.

The communication module is a USB, infrared, or Bluetooth communication interface.

At least one module selected from the group consisting of the generator module, the communication module, the security module and the collator module and the controller module are integrated into a single controller chip.

The controller chip is a security-designed chip, which includes a smartcard chip.

Particularly, the generator module comprises a generation unit for generating a dynamic code under control of the controller module; a detection unit for detecting whether the operation of pressing a button or switch of the key device is performed by a user or not; and a re-generation unit for generating a new dynamic code and then a new first verification code on the basis of the new dynamic code once the detection unit has detected that the button or switch of the key device is pressed by a user; accordingly, the output module is operative to output the new dynamic code under control of the controller module.

By introducing a first verification code and a second verification code generated on the basis of a dynamic code produced by the key device, the first verification code generated within the key device is compared with the second verification code resulted from a user, so that the user is authenticated. Because a different dynamic code is generated by the key device at a time, the verification codes are thereby changing synchronously. Thus, the security strength in authenticating a user of the key device is boosted.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the embodiments and the drawings below.

Figure 1:
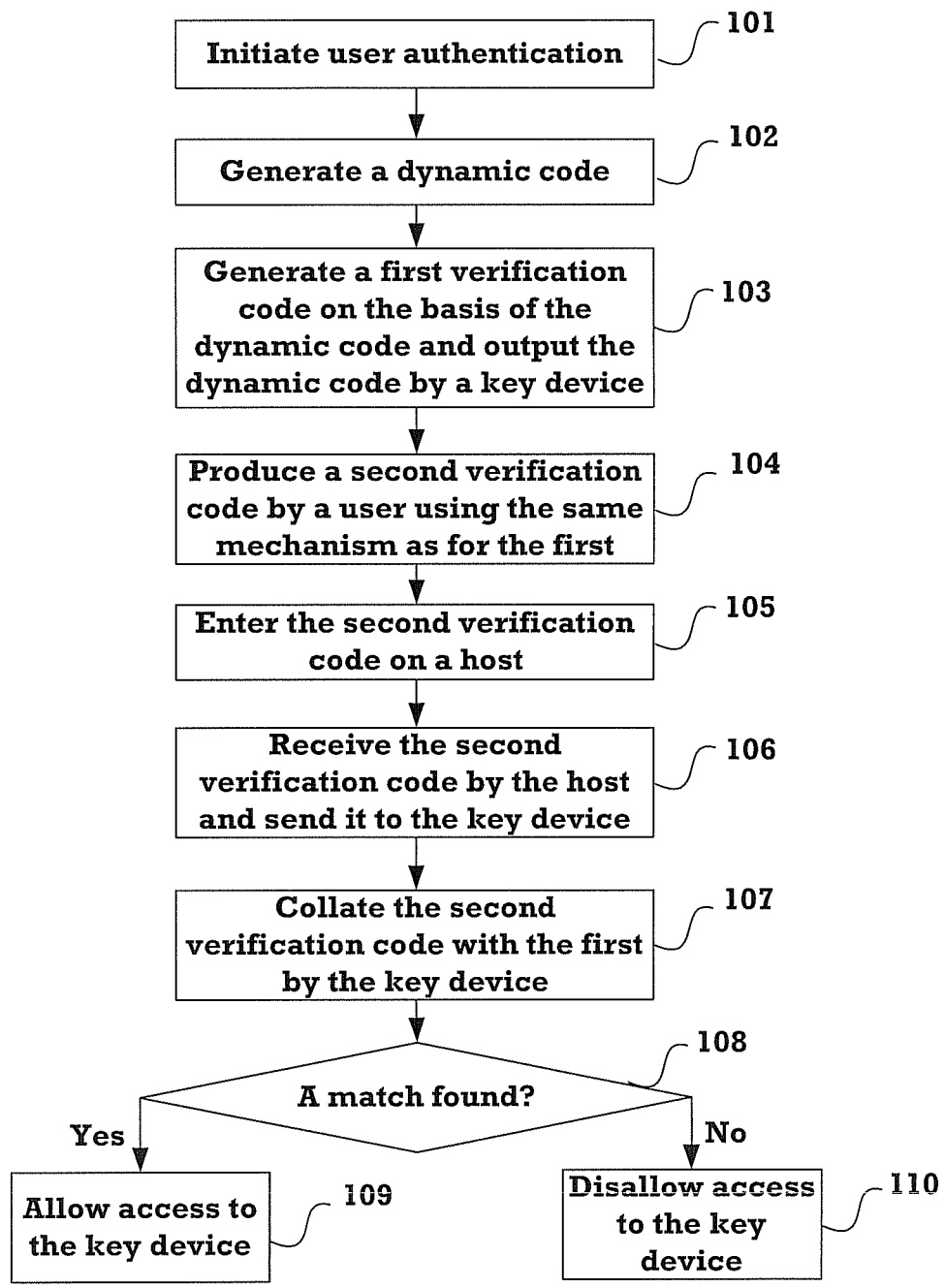
FIG. 1 is a flow diagram of the authentication method of the first embodiment of the present invention.

Referring to FIG. 1, the first embodiment of the present invention provides an authentication method comprising the following steps.

Step 101: The key device initiates user authentication.

The key device may start to perform user authentication by 1) receiving a trigger signal generated from pressing a button or switch of the key device by a user, where a push switch or a toggle switch can be used;

2) receiving a trigger signal produced by a host (For example, after connecting a key device to a host, the host asks the user to press a key on the keyboard to produce a trigger signal, or to click the mouse to produce a trigger signal. By doing so, the user may instruct the host to produce a trigger signal, so that the key device will initiate user authentication); and 3) producing a trigger signal at a regular time interval, where the value of the regular time interval can be previously defined by the manufacturer or user of the key device (For example, the value can be set to 5 minutes or 3 minutes as required. The user may be allowed to reset or change the value).

Step 102: The key device generates a dynamic code CODE.

The key device is capable of generating a dynamic code in accordance with a built-in dynamic code generation algorithm. Typically, a random factor and other factors can be used in generating the dynamic code CODE. The random factor may be, for example, a time or event random factor, which enables the key device to generate a different dynamic code at one time for better security.

Step 103: The key device generates a verification code IDCODE1 on the basis of the dynamic code CODE, and outputs the dynamic code CODE.

The verification code can be produced from the dynamic code by 1) directly using the dynamic code as a verification code;

2) transforming the dynamic code, and using the transformed dynamic code as a verification code;

3) combining the dynamic code with an identification code previously defined, and using the combination as a verification code;

4) combining the dynamic code with an identification code, transforming the combination, and using the transformed combination as a verification; or 5) transforming the dynamic code, combining the transformed dynamic code with an identification code previously defined, and using the combination as a verification code.

The identification code can be previously defined and stored in the key device by its manufacturer. Or the user may be allowed to define and modify such an identification code and remember it by heart.

The transformation can be implemented in many ways. For example, the position or representation of a character in the string can be changed. A previously defined rule may be employed in changing the position of one or more characters in the string of the dynamic code. For example, the transformation for a dynamic code 123456 in accordance with a rule regulating an inversion position change will produce a verification code 654321 as a result. Or, if the rule regulates a 2-digit group inversion change, the result will be 214365. Changing the representation of a character refers to substituting another character for a character in accordance with a specific rule. For example, the transformation for a dynamic code 123456 in accordance with a substitution rule regulating 9 for 1, 8 for 2, 7 for 3, 6 for 4, and no change for 0 and 5 will produce a result of 987654 as a verification code. Or, if the rule regulates an increment of 1 for each character value, the result will be 234567 as a verification code. Moreover, both types of transformation mechanisms can be employed at one time. For example, the dynamic code 1234 can be changed to 4321 and added an increment of 1 to each character value to get a result of 5432.

The combination of the dynamic code and the identification code may vary depending on a specific rule. For example, both a mosaic mechanism and an insertion mechanism can be applied. The mosaic mechanism refers to prefixing or postfixing the dynamic code with the identification code to get a verification code. For example, prefixing a dynamic code 123456 with an identification code 789 will get a result of 789123456; or postfixing the dynamic code 123456 with an identification code 789 will get a result of 123456789. The insertion mechanism refers to placing the identification code in a position following a digit of the dynamic code. For example, insertion of an identification code 789 into a dynamic code 123456 after the second digit will produce a verification code 127893456. Moreover, both types of combination mechanisms can be applied at one time.

One or more verification code generation rules as described above can be designed and stored in the key device by its manufacturer. In case that more than one rule is set, one of them can be specified as a default. By purchasing the key device, a user can obtain the information regarding the rules stored in the device, and may be allowed to change the default rule.

When outputting a generated dynamic code CODE, the key device may put the dynamic code out via a display of the key device or other means, such as a speaker connected with the key device. For a speaker output, the dynamic code is first converted to a voice signal and then may be amplified to broadcast.

Step 104: A user produces a verification code IDCODE2 with the same mechanism as used in generating the verification code IDCODE1, on the basis of the dynamic code CODE output.

Accordingly, the user obtains the dynamic code via the display or the speaker.

If the user wants to use a different dynamic code, he could also press the button or switch of the key device to trigger the key device one more time. The key device then re-generates a new dynamic code and a verification code based on the new dynamic code, and outputs the new dynamic code. The user produces a new verification code using the same mechanism, on the basis of the new dynamic code.

Step 105: The user enters the verification code IDCODE2 on the host.

Step 106: After receiving the verification code IDCODE2, the host transmits it to the key device.

Step 107: The key device receives the verification code IDCODE2 and collates it with the verification code IDCODE1 generated by the key device.

Step 108: The key device determines if a match is found between the two verification codes; if found, the process goes to the next step; otherwise, the process goes to Step 110.

Step 109: The user is authenticated positively and is authorized access to the key device (i.e. the user is a legitimate holder of the key device, and is able to use the device to perform any possible information security operations); the process terminates.

Step 110: The user is authenticated negatively and is prohibited access to the key device (i.e. the user is not a legitimate holder of the key device); the process terminates.

Figure 2:
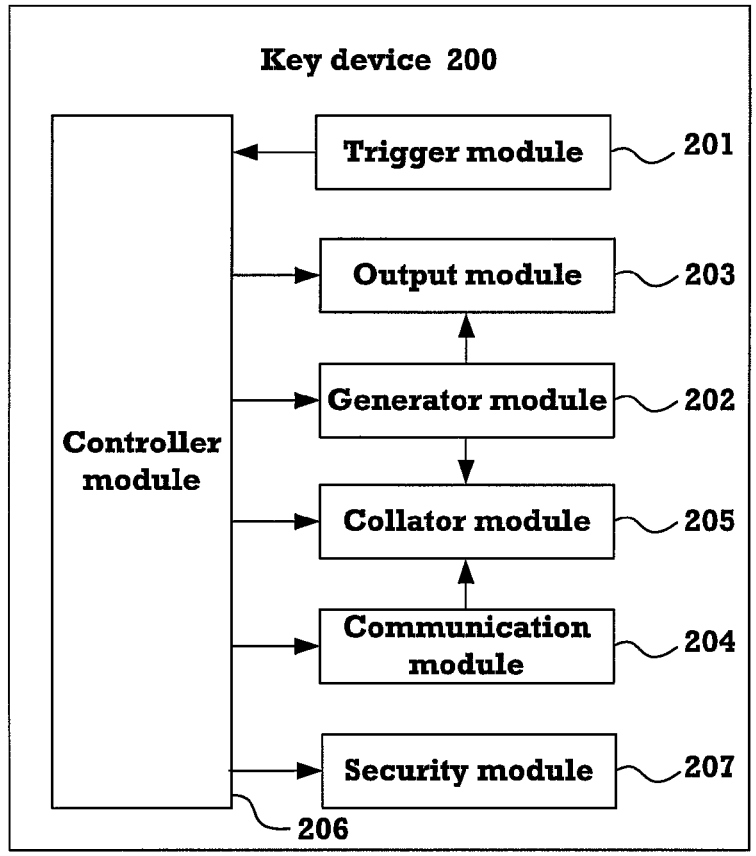
FIG. 2 is a logic block diagram of the key device of the second embodiment of the present invention.

Referring to FIG. 2, the present invention provides a key device 200 comprising a trigger module 201, a generator module 202, an output module 203, a communication module 204, a collator module 205, a controller module 206, and a security module 207.

The trigger module 201 is operative to trigger the controller module 206 to initiate user authentication and is connected with the controller module 206.

The generator module 202 is operative to generate a dynamic code and then a first verification code on the basis of the dynamic code, and transmit the dynamic code to the output module 203 and the first verification code to the collator module 205 under control of the controller module 206, and is connected with the controller module 206, the output module 203, and the collator module 205.

The output module 203 is operative to output the dynamic code from the generator module 202 under control of the controller module 206, and is connected with the generator module 202 and the controller module 206.

The communication module 204 is operative to receive a second verification code entered by a user via a host and transmit the second verification code to the collator module 205 under control of the controller module 206, and is connected with the collator module 205 and the controller module 206. The second verification code entered by the user is produced using the same mechanism as used in generating the first verification code on the basis of the dynamic code output from the key device 200.

The collator module 205 is operative to collate the second verification code from the communication module 204 with the first verification code from the generator module 202 under control of the controller module 206, and is connected with the generator module 202, the communication module 204, and the controller module 206.

The controller module 206 is operative to initiate user authentication after receiving a trigger signal from the trigger module 201, control the generator module 202 to generate the dynamic code and the first verification code and transmit the dynamic code to the output module 203, the output module 203 to output the dynamic code, and the collator module 205 to collate the second verification code with the first verification code, and determine if a match is found between the first and second verification codes to authorize user access to the key device 200 if yes, or to prohibit user access to the key device 200 if no, and is connected with all of these modules and the security module 207.

The security module 207 is operative to perform information security operations under control of the controller module 206 if a match is found between the first and second verification codes in response to collation of the collator module 205, and is connected with the controller module 206. The information security operations include encryption and decryption computations, and managing and controlling of user access to the key device etc.

Preferably, the controller module 206 can be implemented on a security-designed chip.

Preferably, the trigger module 201 can be a button or switch in particular.

Preferably, the trigger module 201 particularly comprises a receiving unit for receiving a trigger signal from the host; and a trigger unit for triggering the controller module 206 to initiate user authentication after the receiving unit has received the trigger signal. In this case, the trigger module 201 and the controller module 206 can be integrated into a single controller chip.

Alternatively, the trigger module 201 particularly comprises a clock unit for counting time; and a trigger unit for automatically triggering the controller module 206 to initiate user authentication after a previously defined regular time interval has elapsed in accordance with a time value obtained from the clock unit. In this case, the trigger module 201 and the controller module 206 can be integrated into a single controller chip.

Preferably, the generator module 202 particularly comprises a direct generation unit for generating a dynamic code and directly using the dynamic code as a verification code under control of the controller module 206.

Or, the generator module 202 particularly comprises a transformed generation unit for generating a dynamic code, transforming the dynamic code, and using the transformed dynamic code as a verification code under control of the controller module 206.

Or particularly, the generator module 202 comprises a combined generation unit for generating a dynamic code, combining the dynamic code with an identification code previously defined, and using the combination as a verification code under control of the controller module 206.

Or particularly, the generator module 202 comprises a combined and transformed generation unit for generating a dynamic code, combining the dynamic code with an identification code previously defined, transforming the combination, and using the transformed combination as a verification code under control of the controller module 206.

Or particularly, the generator module 202 comprises a transformed and combined generation unit for generating a dynamic code, transforming the dynamic code, combining the transformed dynamic code with an identification code previously defined, and using the combination as a verification code under control of the controller module 206.

Preferably, the identification code can be previously set and stored in the key device by its manufacturer, or set and remembered by the user. Also, the user can change the identification code to obtain better security.

During producing a verification code by the generator module 202, the transformation may vary depending on a specific rule. For example, the position or representation of one or more characters in the string of a dynamic code or a combination of a dynamic code and an identification code may be changed. Similarly, the combination of the dynamic code and the identification code may vary depending on a specific rule. For example, both the mosaic and the insertion mechanisms can be applied.

The manufacturer could set one or more foregoing rules in the key device and even specify one of them as a default. By purchasing the device, the user could obtain the information regarding the rules and even change the default rule.

Preferably, the output module 203 particularly comprises a display, such as a segment display, a lattice display, a character display, or a graphic display.

Alternatively, the output module 203 particularly comprises a voice conversion unit for converting the dynamic code generated by the generator module 202 to a voice signal; and a speaker for broadcasting in accordance with the voice signal under control of the controller module 206.

The output module 203 further comprises an audio amplifier for amplifying the voice signal and transmitting it to the speaker. Preferably, the voice conversion unit is implemented on a voice chip. Or the voice conversion unit and the controller module 206 can be integrated into a single controller chip.

Preferably, the communication module 204 comprises a USB, infrared, or Bluetooth interface.

Preferably, the controller module 206 and at least one module selected from the group consisting of the generator module 202, the communication module 204, the security module 207, and the collator module 205 can be integrated into a single controller chip.

Preferably, the controller chip in this embodiment is a security-designed chip, which includes a smartcard chip.

Optionally, the generator module 202 particularly comprises a generation unit for generating a dynamic code under control of the controller module 206; a detection unit for detecting whether a user has pressed a button or switch of the key device 200 or not; and a re-generation unit for generating a new dynamic code and then a new first verification code on the basis of the new dynamic code, once the detection unit has detected the operation of pressing the button or switch. Accordingly, the output module 203 is operative to output the new dynamic code under control of the controller module 206.

Figure 3:
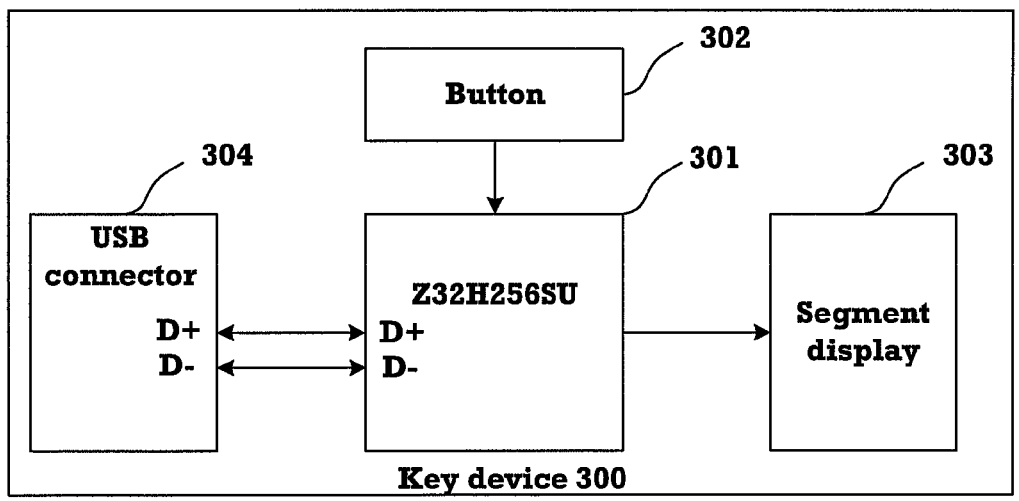
FIG. 3 is a physical block diagram of the key device of the second embodiment of the present invention.

Referring to FIG. 3, a preferred hardware configuration of above embodiment is disclosed. A USB interface key device 300 comprises a housing and a circuit board contained in the housing. A USB interface smartcard chip 301, a button 302, a segment display 303, and a USB connector 304 are disposed on the circuit board. The smartcard chip 301 is a Z32H256SU chip from ZTE Corporation. The Z32H256SU chip is capable of carrying out control functions including control over authentication process, managing information security operations, and processing data. The segment display 303 is incorporated to display the dynamic code generated by the smartcard chip 301. The USB connector 304 is incorporated to communicate with the host. The pin D+ of the smartcard chip Z32H256SU is connected to the pin D+ of the USB connector 304, and the pin D− of the smartcard chip Z32H256SU is connected to the pin D− of the USB connector 304 in the device. Thus, the smartcard chip is capable of communicating with the host via the USB connector 304. The pin D+ and the pin D− of the USB connector 304 are two signal lines for exchanging data with devices on the universal serial bus.

The smartcard chip Z32H256SU contains a 32 KB EEPROM for storing data and programs, and a 256 KB Flash Memory which can be used to store programs, function libraries, and rarely changed data etc. The non-volatile memory of the smartcard chip is suitable for upgrading programs and makes the stored programs more secure.

After connecting the key device 300 with a host via the USB port, the host will ask the user to press a particular key to start user authentication process. When the user presses the key, the smartcard chip Z32H256SU will initiate user authentication upon receipt of the trigger signal.

A dynamic code generation algorithm can be stored in the smartcard chip Z32H256SU in advance. After user authentication begins, it is used for generating a dynamic code. Then, a first verification code is generated. Here, the process of generating the verification code as described in the first embodiment above applies, and no duplicate description will be set out for the process. Furthermore, the smartcard chip Z32H256SU controls over the transmission and output of the generated dynamic code to the segment display 303. The user produces a second verification code with the same mechanism as used in generating the first verification code, on the basis of the dynamic code output, and enters it on the host. The smartcard chip Z32H256SU then collates the second verification code with the first verification code. If a match is found, it is deemed that the user is authenticated positively, and he is a legitimate holder of the key device. Otherwise, it is deemed that the user is authenticated negatively, and he is not a legitimate holder of the key device.

If the user wants to use a new dynamic code for generating a verification code, he could also press the button 302 on the key device 300 to regenerate a dynamic code and then a verification code. Each time a dynamic code is produced, the key device 300 will use it to generate a corresponding verification code.

The USB interface could also be implemented on a USB protocol chip separate from the security-designed chip. For example, the Philips USB interface chip PDIUSBD12 is a choice.

The host is a desktop, a laptop, a server, or a dedicated computer. The key device could also be connected with other peripherals, such as a reader, a communications device, a digital camera, a host peripheral, or other dedicated devices.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. An authentication method, wherein the method comprising the steps of:
   initiating user authentication to a key device connected to a host computer;
   generating a dynamic code by the key device using a time or event random factor;
   generating a first verification code by the key device on the basis of the dynamic code with a mechanism comprising one selected from the group consisting of
      combining the dynamic code with an identification code previously defined by a manufacturer or user of the key device, and transforming the combination into a first verification code by the key device, and
      transforming the dynamic code, and combining the transformed dynamic code with an identification code previously defined by a manufacturer or user of the key device to form a first verification code by the key device;
   outputting the dynamic code by the key device;
   obtaining the dynamic code by the user;
   producing a second verification code by the user with the same mechanism comprising one selected from the group consisting of
      combining the dynamic code with an identification code previously defined by a manufacturer or user of the key device, and transforming the combination into a second verification code by the user, and
      transforming the dynamic code, and the combining the transformed dynamic code with an identification code previously defined by a manufacturer or user of the key device to form a second verification code by the user;
   entering the second verification code on the host by the user;
   receiving the second verification code by the host;
   transmitting the second verification code by the host to the key device connected to the host;
   receiving the second verification code by the key device;
   collating the second verification code with the first verification code by the key device; if a match is found, authorizing access of the user to the key device via the host; otherwise, prohibiting access of the user to the key device;
   if the user gains the access to the key device, performing by the key device information security operations comprising presetting a user software fragment, which cannot be read out of the device and is used to perform data computation within the device, and presetting a software protection application interface function, which is an interface-level function between the device and the software developer application.

2. The authentication method as claimed in claim 1, wherein the step of initiating user authentication by a key device particularly comprises one selected from the group consisting of that the key device starts user authentication after receiving a trigger signal produced from pressing a button or switch on the key device by a user, that the key device starts user authentication after receiving a trigger signal from a host, and that the key device automatically starts user authentication at a regular time interval.

3. The authentication method as claimed in claim 2, wherein a value of the regular time interval is previously defined by a manufacturer or user of the key device.

4. The authentication method as claimed in claim 1, wherein the combining is carried out by mosaic and/or insertion, and the transforming is carried out by changing character position in accordance with a rule previously defined and/or representation.

5. The authentication method as claimed in claim 1, wherein the step of outputting the dynamic code particularly comprises outputting the dynamic code to a display of the key device, or to a speaker connected with the key device to broadcast by voice.

6. The authentication method as claimed in claim 1, wherein the step of generating a dynamic code and then a first verification code on the basis of the dynamic code, and outputting the dynamic code, by the key device particularly comprises the substeps of:
   generating a dynamic code by the key device;
   generating a new first dynamic code when pressing on a button or switch of the key device by a user is detected by the key device; and
   generating a verification code on the basis of the new dynamic code and outputting the new dynamic code by the key device.

7. A key device connected to a host computer, wherein the key device comprising a trigger module, a generator module, an output module, a communication module, a collator module, a controller module, and a security module;
   the trigger module being operative to trigger the controller module to initiate user authentication to the key device;
   the generator module being operative to generate a dynamic code using a time or event random factor and then a first verification code on the basis of the dynamic code, and transmitting the dynamic code to the output module, and the first verification code to the collator module, under control of the controller module, wherein the generator module comprises one unit selected from the group consisting of
      a combined and transformed generation unit for generating a dynamic code under control of the controller module, combining the dynamic code with an identification code previously defined by a manufacturer or user of the key device, transforming the combination of the dynamic code and the identification code, and using the transformed combination as the first verification code, and
      a transformed and combined generation unit for generating a dynamic code under control of the controller module, transforming the dynamic code, combining the transformed dynamic code with an identification code previously defined by a manufacturer or user of the key device, and using the combination as the first verification code;
   the output module being operative to output the dynamic code received from the generator module for reception by a user, under control of the controller module;
   the communication module being operative to receive a second verification code entered by the user via the host and transmit the second verification code to the collator module under control of the controller module, the second verification code being produced by the user with the same mechanism comprising one selected from the group consisting of combining the dynamic code with an identification code previously defined by a manufacturer or user of the key device, and transforming the combination into a second verification code; and transforming the dynamic code, and then combining the transformed dynamic code with an identification code previously defined by a manufacturer or user of the key device to form a second verification code;

the collator module being operative to collate the second verification code with the first verification code under control of the controller module;

the controller module being operative to initiate user authentication after receiving a trigger signal from the trigger module, control the generator module to generate the dynamic code and the first verification code and transmit the dynamic code to the output module, the output module to output the dynamic code, and the collator module to collate the second verification code with the first verification code, and determine if a match is found between the first and second verification codes to authorize user access to the key device via the host if yes or to prohibit user access to the key device if no; and the security module being operative to perform information security operations under control of the controller module if a match is found between the first and second verification codes in response to collation of the collator module;

wherein the information security operations comprising presetting a user software fragment, which cannot be read out of the device and is used to perform data computation within the device, and presetting a software protection application interface function, which is an interface-level function between the device and the software developer application.

8. The key device as claimed in claim 7, wherein the trigger module particularly is a button or switch.

9. The key device as claimed in claim 7, wherein the trigger module particularly comprises a receiving unit for receiving the trigger signal from the host; and a trigger unit for triggering the controller module to initiate user authentication after the trigger signal is received by the receiving unit.

10. The key device as claimed in claim 9, wherein the trigger module and the controller module are integrated into a single controller chip, which is a security-designed chip including a smartcard chip.

11. The key device as claimed in claim 7, wherein the trigger module particularly comprises a clock unit for counting time; and a trigger unit for automatically triggering the controller module to initiate user authentication once a regular time interval previously defined has elapsed in accordance with a time value obtained from the clock unit.

12. The key device as claimed in claim 7, wherein the output module particularly is a display.

13. The key device as claimed in claim 7, wherein the output module particularly comprises a voice conversion unit for converting the dynamic code generated by the generator module to a voice signal; and a speaker for broadcasting in accordance with the voice signal under control of the controller module.

14. The key device as claimed in claim 13, wherein the output module further comprises an audio amplifier for amplifying the voice signal and transmitting the amplified voice signal to the speaker.

15. The key device as claimed in claim 13, wherein the voice conversion unit is a voice chip, or is integrated with the controller module on a single controller chip, which is a security-designed chip including a smartcard chip.

16. The key device as claimed in claim 7, wherein the communication module is a USB, infrared, or Bluetooth communication interface.

17. The key device as claimed in claim 7, wherein at least one module selected from the group consisting of the generator module, the communication module, the security module, and the collator module is integrated with the controller module on a single controller chip, which is a security-designed chip including a smartcard chip.

18. The key device as claimed in claim 7, wherein the generator module particularly comprises a generation unit for generating a dynamic code under control of the controller module;

a detection unit for detecting whether the operation of pressing a button or switch of the key device is performed by a user or not; and a re-generation unit for generating a new dynamic code and then a new first verification code on the basis of the new dynamic code once the detection unit detects that the button or switch of the key device is pressed by a user;

accordingly, the output module is operative to output the new dynamic code under control of the controller module.

* * * * *